United States Patent [19]

Gaysert et al.

[11] Patent Number: 4,595,356
[45] Date of Patent: Jun. 17, 1986

[54] BURNER CONSTRUCTION FOR AIR HEATERS USING AN ULTRASONIC ATOMIZER

[75] Inventors: Gerhard Gaysert, Esslingen; Reinhard Gerwin, Stuttgart-Ost; Dieter Götz, Kirchheim, all of Fed. Rep. of Germany

[73] Assignee: J. Eberspacher, Fed. Rep. of Germany

[21] Appl. No.: 497,177

[22] Filed: May 23, 1983

[30] Foreign Application Priority Data

May 21, 1982 [DE] Fed. Rep. of Germany ....... 3219065

[51] Int. Cl.$^4$ .............................................. F23D 15/02
[52] U.S. Cl. ........................................ 431/352; 431/1; 431/263; 237/12.3 C
[58] Field of Search ............... 431/1, 263, 350, 351, 431/352; 237/12.3 C; 60/39.76, 39.77

[56] References Cited

U.S. PATENT DOCUMENTS

| 3,267,986 | 8/1966 | Olsson ..................................... 431/1 |
| 3,368,604 | 2/1968 | Mutchler ............................. 431/263 |
| 3,932,109 | 1/1976 | Pitcher et al. ........................ 431/1 |
| 4,473,348 | 9/1984 | Tikhonovich et al. ................ 431/1 |

FOREIGN PATENT DOCUMENTS

| 0731181 | 4/1980 | U.S.S.R. .................................... 431/1 |
| 0879146 | 11/1981 | U.S.S.R. .................................... 431/1 |

Primary Examiner—Margaret A. Focarino
Attorney, Agent, or Firm—McGlew and Tuttle

[57] ABSTRACT

A burner for air heaters comprises a first wall structure defining an ignition chamber with an ultrasonic atomizer discharging into the ignition chamber and with means for delivering primary air into the ignition chamber for ignition by suitable ignition device to form an igniting gas mixture. The construction includes a second wall arrangement which is adjacent the ignition chamber and which defines a primary combustion chamber which has a passage for the ignited gas mixture from the ignition chamber and also for secondary air so as to complete the combustion in the main combustion chamber. The main combustion chamber in turn is connected downstream and into an exhaust diffuser in which the completely burnt gases are delivered to a place of use for heating an area such as a space in a motor vehicle. In one construction, the combustion chamber is defined within a perforated tube which has a perforated bottom or rear wall facing an ignition chamber which is defined with an outer tube which is also perforated to provide for the inflow of the primary air. The ignition device is mounted in the outer tube adjacent the atomizer so as to ignite the fuel with the primary air and direct this ignited mixture into perforations of the main combustion chamber for continued burning therein. In another embodiment the primary chamber is defined by a perforated wall which defines an area within the outer perforated housing which comprises the ignition chamber having the atomizer in an igniting element. This ignition-chamber communicates through perforations in the surrounding wall with an inlet for the primary air and one or more inlets for the secondary air in the remaining space within the outer housing which defines the main combustion chamber.

17 Claims, 8 Drawing Figures

BURNER CONSTRUCTION FOR AIR HEATERS USING AN ULTRASONIC ATOMIZER

FIELD AND BACKGROUND OF THE INVENTION

The invention relates in general to heaters and in particular to a burner equipped with an ultrasonic atomizer and intended for smaller air heating appliances employed in non-stationary spaces, such as in vehicles, trailers, or tents, and having powers of less than 10 kW.

As is well known, ultrasonic atomizers for liquid fuel have a particularly satisfactory atomizing effect, only as compared to pressure atomizers. They require another design of the ignition and combustion systems of the burner, and a powerful flow of the supplied combustion air. However, in contradistinction to a vaporizing burner with or without a rotary distributor, short ignition and transition periods up to steady operating conditions can be obtained and aftersmoke upon turning off can be eliminated. In general, a better combustion can be ensured and thus the emission of noxious substances reduced. Also, spark plugs requiring substantially less power can be used instead of glow plugs.

A spatial separation of the ignition zone from the combustion zone and a separate supply of primary and secondary combustion air is known from German AS 12 57 396, for a conventional atomizing burner. In this prior art design, the separation of the two zones is effected by a housing shell in which the stream of the ignited mixture of atomized fuel and primary air is deflected, forced through a throttling slot and contacted with a countercurrently directed stream of secondary air. This arrangement requires an extraordinarily high amount of combustion air energy, and is unsuitable for ultrasonic atomizer burners.

SUMMARY OF THE INVENTION

In accordance with the invention, a burner for air heaters comprises a first wall arrangement which defines an ignition chamber having an ultrasonic atomizer mounted thereon which discharges into the ignition chamber and combines the fuel which is discharged with primary air which is admitted into the ignition chamber. A second wall arrangement defines a main combustion chamber which is adjacent to the ignition chamber. If the fuel is ignited by an igniting device in the ignition chamber it forms an ignited gas mixture which flows through perforations in the walls defining the main combustion chamber. In addition, secondary air is admitted into the main combustion chamber so as to produce high temperature gases during combustion therein which are then delivered through a diffuser to a place of use.

The invention has many embodiments of a construction to define the ignition chamber and the combustion chamber. In one such embodiment the ignition chamber is defined within an outer housing having inlets for primary air and a wall in which the atomizer is mounted on which is spaced away from a wall which defines a main combustion chamber. The main combustion chamber receives secondary air from an air supply connected to the outer housing which flows through perforations in the wall defining the main combustion chamber. In another arrangement the ignition chamber is defined by a perforated wall enclosing a space within the outer housing and the primary air must flow from the outer housing into the perforated wall which defines the space for the ignition chamber. In this embodiment the main combustion chamber is defined in the remaining portion of the outer housing.

The invention also envisions the formation of the ignition chamber in a sector of a cylindrical housing in which the perforated wall separates the interior of the cylindrical housing into an ignition chamber and a main combustion chamber and this perforated wall may be either continuous or may be discontinued to have an open end for the outflow of the ignited gases into the main combustion chamber.

With the atomizer mounted axially, the rear side of the cylindrical housing turned to the point of utilization of the hot gas supports an exhaust diffuser wherein kinetic energy is advantageously transformed into static pressure. In this design, the housing is provided around the atomizer disc with primary air inlets and on its periphery with secondary air inlets. The housing is surrounded by a jacket radially spaced therefrom and supplied with the combustion air. The primary and secondary air inlets connect to this space between the jacket and the housing so that suitable low-loss conditions are created for the air flow.

In one embodiment of the invention, the main combustion chamber is advantageously formed by a perforated tube which extends axially within the outer housing which defines the ignition chamber adjacent the closed end of the main combustion chamber perforated tube. The perforated tube which defines the main combustion chamber advantageously extends into the divergent wall section of a diffuser which receives the gases burned in the main combustion chamber and transmits them to the space of the heater. In an alternative manner, the ignition zone may be separated from the remaining portion of the housing forming the main combustion chamber by a perforated tubular wall. The combustion air inlets provided in the housing remain unchanged as compared to the first embodiment. To steady the process of burning, a short tube length is inserted between the housing and the diffuser, as a smooth transition, without a step.

With the atomizer mounted radially, the upstream front side of the housing is designed as a secondary air supply nozzle and the rear side of the housing as an outlet flange for the hot gas. This design is particularly favorable to flow conditions. The atomizer comprises a laterally extending primary air supply connection in addition to the fuel connection. This primary air flows in the longitudinal direction of the atomizer, past the atomizer disc, and enters the ignition chamber through outlets arranged around the atomizer disc.

In a first embodiment of the radial atomizer arrangement, the two zones are separated from each other by providing an ignition chamber in the shape of an annular sector formed by a wall equidistantly spaced from the circumference of the housing, two axially adjacent perforated cross walls, and at least one radial perforated longitudinal wall closing in the circumferential direction, which is located in the front part of the combustion zone enclosed by the housing.

In a second embodiment of this radial atomizer arrangement, the ignition chamber is enlarged to an annular shape by a tubular extension of the secondary air supply nozzle, and an adjacent perforated cross wall.

In a third embodiment of the radial atomizer arrangement, the tubular extension is perforated within the range of the ignition chamber, and the adjacent cross wall having the shape of an annular plate may be left unperforated. This causes the ignited mixture to flow directly axially into the combustion chamber bounded by the housing, not radially inwardly into the stream of secondary air, as in the second embodiment.

In a fourth embodiment of the radial version, the tubular extension projects into the combustion chamber. This projecting end of the extension, and/or the bottom thereof is perforated, so that the mixing space in the combustion chamber is particularly large.

Accordingly, it is an object of the invention to provide a burner for air heaters which includes a housing arrangement defining an ignition chamber which is supplied with primary air and has an ultrasonic atomizer and an igniting device for the fuel therein to ignite the primary air and fuel mixture to form igniting gases which may flow through a perforated wall into a main combustion chamber which is also supplied with secondary air for the continued combustion so as to generate high temperature gasses which are exhausted through an exhaust diffuser to the space of use.

A further object of the invention is to provide a burner construction for air heaters which are simple in design, rugged in construction and economical to manufacture.

The various features of the novelty which characterize the invention are pointed out with particularity in the claims annexed to and forming a part of this disclosure. For a better understanding of the invention,, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
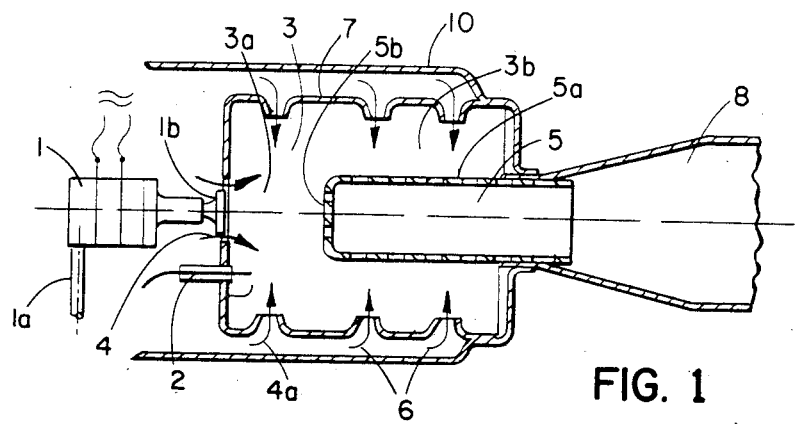
FIG. 1 is a partial sectional view of a burner constructed in accordance with the invention.

Referring to the drawings in particular the invention embodied therein comprises a burner for air heaters, comprising an ultrasonic atomizer 1 which in the embodiment of FIG. 1 is mounted to discharge into an opening an end wall of a first wall means 7 in the form of an outer tubular housing which defines an inner ignition chamber 3. The primary air inlet means in the form of perforations or openings 4a connect into the ignition chamber 3. Second wall means in the form of a perforated tube 5a defines a main combustion chamber 5 which is adjacent to the ignition chamber 3. Ignition means in the form of an ignition plug 2 is arranged in the ignition chamber 3 for igniting fuel with primary air. Passage means in the form of perforation 5b in the perforated tube 5a defining the main combustion chamber 5 are provided with gases which are formed by igniting fuel with the primary air to form the igniting gas mixture which flows into the main combustion chamber from the ignition chamber 3.

Secondary air inlet means 3b connect into the main combustion chamber 5 and include the perforated portions 5b defining the main combustion chamber 5. Secondary air ignites with the ignited gas mixture for combustion within the main combustion chamber 5 to produce high temperature gases. Diffuser 8 is provided with a divergent wall section and is connected to the combustion chamber 5 and provides an exhaust for the high temperature gases which are directed to the place of use.

According to FIG. 1, the ultrasonic atomizer 1 is mounted axially and centrally on the front side of a cylindrical housing 7. The atomizer is provided with a sidewards extending fuel supply connection 1a and comprises an atomizer disc 1b around which primary air inlets are arranged. Atomizer 1 discharges into an ignition zone 3a of an ignition chamber 3 bounded by housing 7. The sparking zone of an ignition plug 2 is also located within the ignition zone. A combustion chamber 5 formed by a perforated tube 5a having upstream a perforated bottom 5b projects into the downstream extended part of 3b of chamber 3. At the downstream side, tube 5a slightly projects into an exhaust diffuser 8 which is secured to housing 7 and discharges the hot gas.

Housing 7 is provided on its circumference with secondary air inlets 6 and is surrounded by a jacket 10 into which the combustion air is supplied to pass into chamber 3 through primary air inlets 4a which are provided in the foremost, upstream part of the chamber, and also through the secondary air inlets 6. Atomized fuel intimately mixed with primary air flows through fuel inlets 4 at atomizer disc 1b to the sparking zone within ignition chamber 3. The ignited mixture passes through the perforations in walls 5a and 5b into the combustion chamber 5 where the secondary air flows through inlets 6 in the rear or downstream part of the combustion chamber. After burning the fuel down, the produced heating gas is discharged through exhaust diffuser 8 to the point of utilization.

Figure 2:
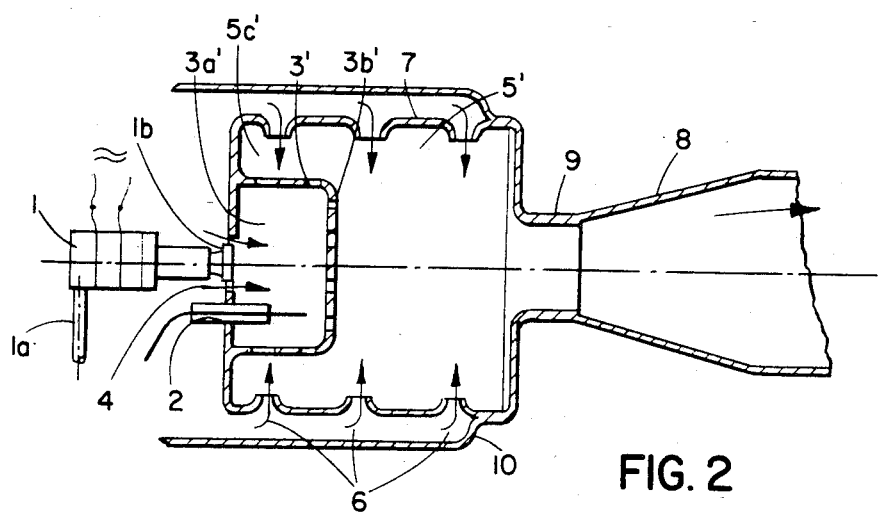
FIG. 2 is a view similar to FIG. 1 of another embodiment of the invention.

According to FIG. 2, the ignition chamber 3a' is formed by a perforated tube length 3' having a perforated bottom 3b and protruding into a part 5 c of housing 7 or combustion chamber 5' which is extended in the upstream direction. In this embodiment, exhaust diffuser 8 is connected to the downstream side of the housing 7 in a smooth manner, through a short tube length 9 which is effective as a flame damper.

Figure 4:
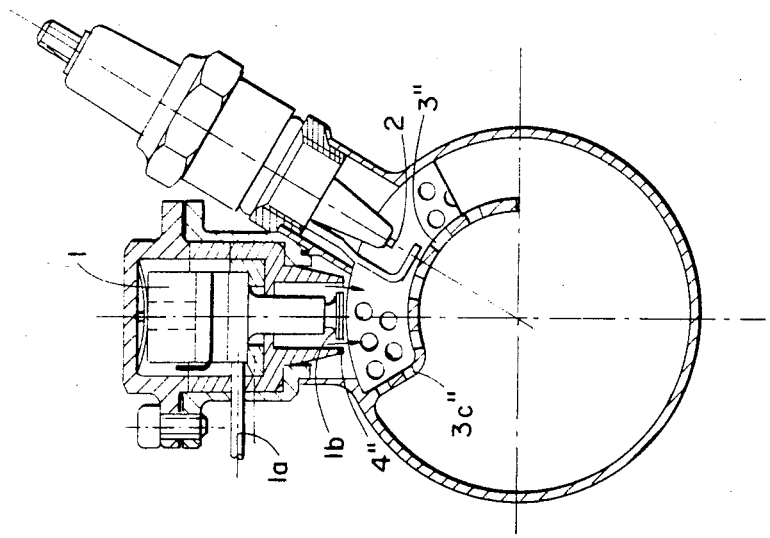
FIG. 4 is a section taken along the line 4—4 of FIG. 3.
Figure 3:
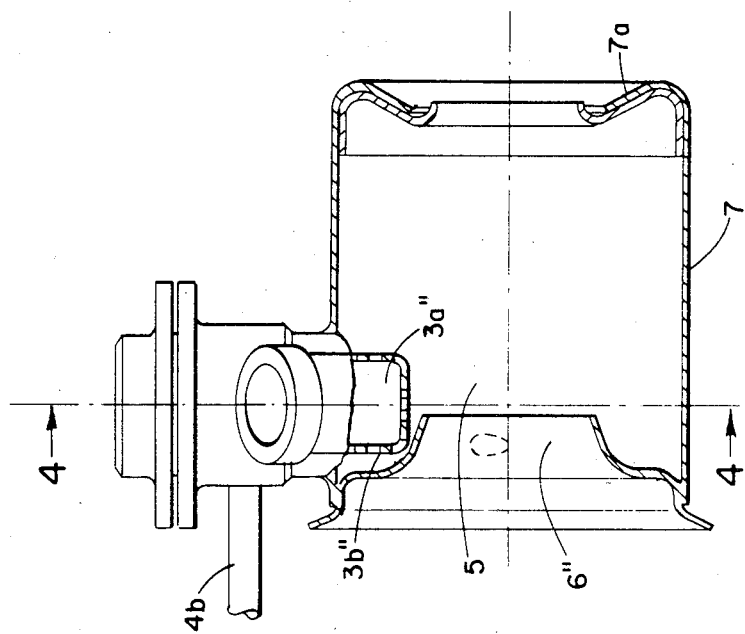
FIG. 3 is an axial sectional view of another embodiment of the invention.

According to FIGS. 3 and 4, ultrasonic atomizer 1 is mounted radially on housing 7, close to the upstream front side thereof, which is designed as a secondary air supply nozzle 6". The rear side of the housing is designed as an outlet flange 7a for the heating gas. The atomizer is equipped laterally with a supply connection 4 for primary air which then passes along atomizer 1 through outlets 4" which are arranged around atomizer disc 1b, to arrive thoroughly mixed with the atomized fuel at ignition zone 3a" where the mixture is ignited in the sparking zone of ignition plug 2.

The ignition chamber is formed in this embodiment by a perforated sectorial wall 3" equidistantly spaced from the cylindrical surface of the housing, two axially adjacent perforated radial walls 3b''', and a radially extending perforated wall 3c'' extending in the axial direction and closing the chamber unilaterally, condidered in the circumferential direction.

Figure 6:
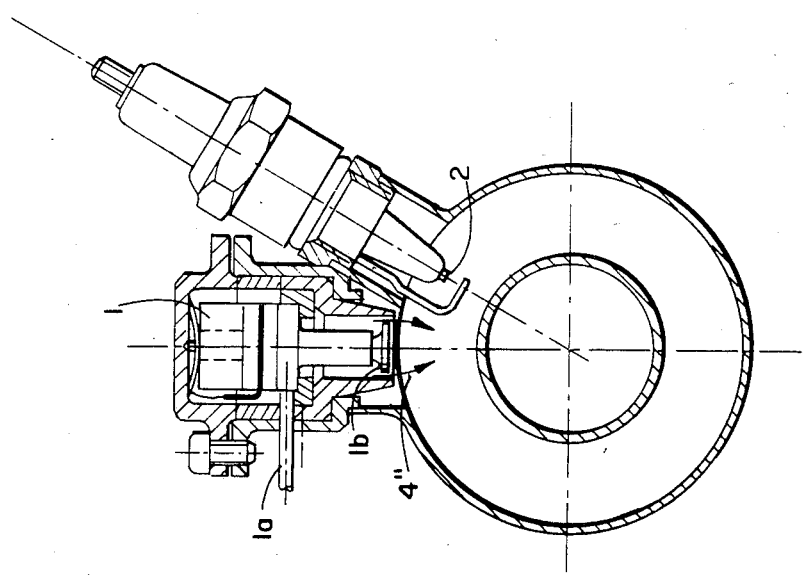
FIG. 6 is a section taken along the line 6—6 of FIG. 5.
Figure 5:
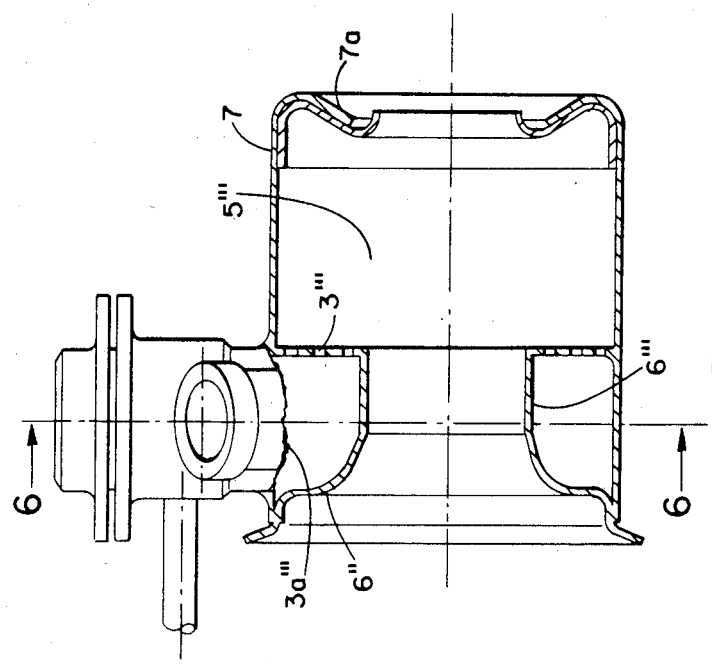
FIG. 5 is a view similar to FIG. 3 of another embodiment of the invention.

FIGS. 5 and 6 show a modification of the embodiments of FIGS. 3 and 4 wherein the secondary air supply nozzle is provided with a tubular extension 6''', and an adjacent perforated radially extending annular wall 3''' or cross wall is provided which, along with the tubular extension 6''', separates the ignition zone 3a''' from the combustion zone 5'''.

Figure 7:
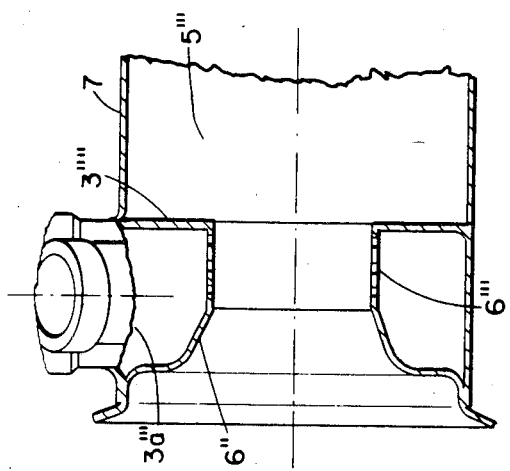
FIG. 7 is a view similar to FIG. 5 of another embodiment of the invention.

According to FIG. 7, the tubular extension is perforated and the adjacent cross wall 3,3''' is solid.

Figure 8:
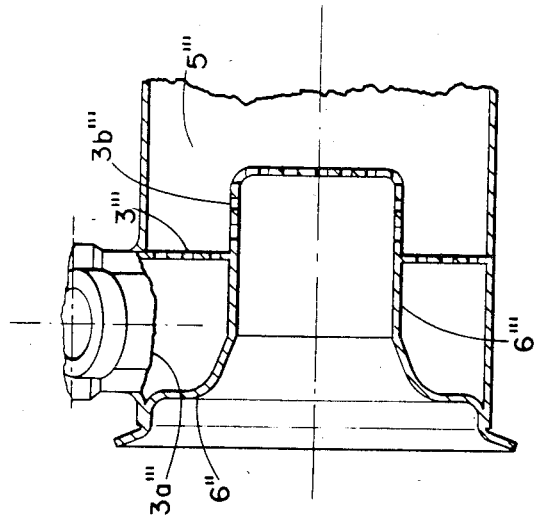
FIG. 8 is a view similar to FIG. 5 of still another embodiment of the invention.

According to FIG. 8, the tubular extension 6''' protrudes up to the interior of combustion zone 5''' where it is perforated and terminates with an also perforated bottom 3b'''.

While specific embodiments of the invention have been shown and described in detail to illustrate the application of the principles of the invention, it will be understood that the invention may be embodied otherwise without departing from such principles.

What we claim is:

1. A burner for air heaters, comprising first wall means defining an ignition chamber, an ultrasonic atomizer discharging fuel into said ignition chamber, primary air inlet means connected into said ignition chamber, second wall means defining a combustion chamber adjacent to said ignition chamber, ignition means in said ignition chamber for igniting fuel with primary air to form an igniting gas mixture, passage means for the passage of ignited gas mixture from said ignition chamber into said combustion chamber, secondary air inlet means connected into said combustion chamber to ignite secondary air with said ignited gas mixture for combustion within said combustion chamber so as to produce high temperature gases, and a diffuser connected to said combustion chamber for the exhaust of the high temperature gases from said combustion chamber.

2. A burner according to claim 1, wherein said first wall means includes a tubular housing having an end wall with an opening, said atomizer being mounted concentrically within said opening and disposed axially in respect to said housing, said diffuser being supported in the opposite end of said housing and substantially axially concentric.

3. A burner according to claim 2, wherein said primary air inlet means includes an opening in said wall around said atomizer, said secondary air inlet means including a plurality of openings in said outer wall of said tubular housing.

4. A burner according to claim 3, including a jacket surrounding said outer housing and defining an air space between said housing and said jacket for the supply of combustion air, said primary air inlet means including at least one opening in said outer housing connected to the space for the combustion air, said secondary air inlet means comprising at least one opening in said outer housing for the flow of secondary air to said main combustion chamber.

5. A burner according to claim 1, wherein said passage means comprises a perforated wall at least partly separating said ignition chamber from said combustion chamber.

6. A burner for air heaters, comprising an outer cylindrical jacket, an outer cylindrical housing arranged within said jacket in spaced relationship to the interior thereof defining a primary air flow space therebetween, said outer cylindrical housing having a closed wall with a central opening at its rear end, a fuel atomizer mounted in said jacket and arranged to atomize fuel which is directed into the opening of said closed wall, an igniting device arranged in said closed wall adjacent the opening to ignite the fuel therein, said outer housing including a plurality of primary air inlets adjacent its rear end, a perforated tube arranged within said outer housing having perforated side wall and a perforated end wall facing said atomizer, said perforated tube defining an ignition chamber on one side of said end wall which contains said ignition device, and a main combustion chamber on an opposite side of said end wall, a plurality of secondary air inlets defined in said outer housing communicating with the space between said jacket and said outer housing for the supply of secondary air through said inlets and through the perforations of said perforated tube to said main combustion chamber, said main combustion chamber having an opening at its opposite end for the discharge of exhaust gases.

7. A burner according to claim 6, wherein said perforated tube extends outwardly beyond said outer housing and including an exhaust diffuser tube engaged over the extending portion of said perforated tube and having a divergent wall portion.

8. A burner for air heaters, comprising first wall means defining an ignition chamber, an ultrasonic atomizer discharging fuel into said ignition chamber, primary air inlet means connected into said ignition chamber, second wall means defining a combustion chamber adjacent to said ignition chamber, ignition means in said ignition chamber for igniting fuel with primary air to form an igniting gas mixture, passage means for the passage of ignited gas mixture from said ignition chamber into said combustion chamber, secondary air inlet means connected into said combustion chamber to ignite secondary air with said ignited gas mixture for combustion within said combustion chamber so as to produce high temperature gases, and a diffuser connected to said combustion chamber for the exhaust of the high temperature gases from said combustion chamber, said first wall means comprising a cylindrical outer housing and an inner partial wall within said cylindrical outer housing comprising a perforated radial portion and a perforated arcuate portion connected to the radial portion at an inwardly spaced location from the exterior of said outer housing and defining on one side thereof said ignition chamber and on the opposite side thereof said combustion chamber, said second wall means comprising the opposite side of said partial wall from said ignition chamber and the remaining portion of said outer housing from said ignition chamber, said atomizer and said ignition means being mounted to extend radially into said ignition chamber.

9. A burner according to claim 8, wherein said atomizer has a lateral primary air inlet connection and including primary air outlets provided around said atomizer, said atomizer including a rotary disc.

10. A burner according to claim 9, wherein said ignition chamber comprises an annular chamber, said combustion chamber being separated from said annular chamber by a perforated annular wall.

11. A burner according to claim 9, wherein said first wall means defining an ignition chamber includes a solid wall extending radially inwardly from one end of said outer cylindrical housing and having an axially extending portion connected to said radial portion and including a perforated annular wall interconnecting said axially extending portion to the periphery of said outer housing, said ignition chamber being an annular chamber communicating with said combustion chamber through the perforated annular wall at one end thereof.

12. A burner according to claim 11, wherein the perforated portion of said wall extends axially.

13. A burner according to claim 11, wherein said combustion chamber has a perforated wall which extends axially and radially.

14. A burner for air heaters, comprising first wall means defining an ignition chamber, an ultrasonic atomizer discharging fuel into said ignition chamber, primary air inlet means connected into said ignition chamber, second wall means defining a combustion chamber adjacent to said ignition chamber, ignition means in said ignition chamber for igniting fuel with primary air to form an igniting gas mixture, passage means for the passage of ignited gas mixture from said ignition chamber into said combustion chamber, secondary air inlet means connected into said combustion chamber to ignite secondary air with said ignited gas mixture for combustion within said combustion chamber so as to produce high temperature gases, and a diffuser connected to said combustion chamber for the exhaust of the high temperature gases from said combustion chamber, said first wall means including a tubular housing having an end wall with an opening, said atomizer being mounted concentrically within said opening and disposed axially in respect to said housing, said diffuser being supported in the opposite end of said housing and substantially axially concentric, said primary air inlet means including an opening in said wall around said atomizer, said secondary air inlet means including a plurality of openings in said outer wall of said tubular housing, said second wall means comprising a perforated tube arrangement within said outer housing and extending coaxially in respect thereto and having an extension at its downstream end, said diffuser comprising a tubular member mounted over the perforated tube at its open end thereof, the opposite end of said perforated tube being closed and provided with perforations.

15. A burner according to claim 14, wherein said primary air inlets are provided at one end of said outer housing adjacent its circumference.

16. A burner for air heaters, comprising first wall means defining an ignition chamber, an ultrasonic atomizer discharging fuel into said ignition chamber, primary air inlet means connected into said ignition chamber, second wall means defining a combustion chamber adjacent to said ignition chamber, ignition means in said ignition chamber for igniting fuel with primary air to form an igniting gas mixture, passage means for the passage of ignited gas mixture from said ignition chamber into said combustion chamber, secondary air inlet means connected into said combustion chamber to ignite secondary air with said ignited gas mixture for combustion within said combustion chamber so as to produce high temperature gases, and a diffuser connected to said combustion chamber for the exhaust of the high temperature gases form said combustion chamber, said first wall means including a tubular housing having an end wall with an opening, said atomizer being mounted concentrically within said opening and disposed axially in respect to said housing, said diffuser being supported in the opposite end of said housing and substantially axially concentric, said primary air inlet means including an opening in said wall around said atomizer, said second air inlet means including a plurality of openings in said outer wall of said tubular housing, a jacket surrounding said outer housing and defining an air space between said housing and said jacket for the supply of combustion air, said primary air inlet means including at least one opening in said outer housing connected to the space for the combustion air, said secondary air inlet means comprising at least one opening in said outer housing for the flow of secondary air to said main combustion chamber, said first wall means including an outer tubular housing having a rear end carrying said atomizer and an opposite downstream end connected to said diffuser and also including a cylindrical member arranged within said outer housing having perforated side and front walls and having an open rear being connected at its side walls to said rear wall of said outer housing, said second wall means comprising the interior of said outer housing and the exterior of said inner cylindrical member.

17. A burner according to claim 16, wherein said outer tubular housing includes a rear wall with a cylindrical extension of a smaller diameter than the diameter of said housing, said diffuser comprising a tubular member engaged over said cylindrical extension.

* * * * *